United States Patent
Fujikane et al.

(10) Patent No.: US 9,580,338 B2
(45) Date of Patent: Feb. 28, 2017

(54) LIQUID TREATMENT APPARATUS AND LIQUID TREATMENT METHOD

(71) Applicant: Panasonic Intellectual Property Management Co., Ltd., Osaka (JP)

(72) Inventors: Masaki Fujikane, Osaka (JP); Mari Onodera, Osaka (JP); Shin-Ichi Imai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 125 days.

(21) Appl. No.: 14/530,791

(22) Filed: Nov. 2, 2014

(65) Prior Publication Data
US 2015/0136711 A1 May 21, 2015

(30) Foreign Application Priority Data

Nov. 18, 2013 (JP) .................................. 2013-238038

(51) Int. Cl.
*C02F 1/44* (2006.01)
*F02M 37/22* (2006.01)
(Continued)

(52) U.S. Cl.
CPC ............ *C02F 1/4608* (2013.01); *C02F 1/467* (2013.01); *C02F 1/46114* (2013.01);
(Continued)

(58) Field of Classification Search
CPC .... C02F 1/4608; C02F 1/46114; C02F 1/467; C02F 2201/4619; C02F 2303/04; C02F 1/04; B01J 19/088
See application file for complete search history.

(56) References Cited

U.S. PATENT DOCUMENTS 5,464,513 A 11/1995 Goriachev et al.
5,630,915 A 5/1997 Greene et al.
(Continued)

FOREIGN PATENT DOCUMENTS

DE 19633342 2/1998
EP 2072471 6/2009
(Continued)

OTHER PUBLICATIONS

English Translation of Chinese Search Report dated Mar. 1, 2016 for the related Chinese Patent Application No. 201410455407.3.

*Primary Examiner* — Ana Fortuna
(74) *Attorney, Agent, or Firm* — McDermott Will & Emery LLP (57) ABSTRACT

A liquid treatment apparatus according to the present disclosure includes a dielectric tube that defines a channel through which water to be treated flows, the channel being split upstream of the dielectric tube into a first channel and a second channel, the first channel and the second channel being merged with each other downstream of the dielectric tube, a first electrode at least partially disposed within the first channel, a second electrode at least partially disposed within the first channel, a first gas-supply unit that supplies gas to form a gas bubble into water to be treated that flows through the first channel, and a first power-supply that applies a voltage between the first electrode and the second electrode.

19 Claims, 4 Drawing Sheets (51) Int. Cl.
*C07C 1/00* (2006.01)
*C02F 1/46* (2006.01)
*C02F 1/461* (2006.01)
*C02F 1/467* (2006.01)

(52) U.S. Cl.
CPC ........... *C02F 2001/46138* (2013.01); *C02F 2201/4611* (2013.01); *C02F 2201/4619* (2013.01); *C02F 2201/46175* (2013.01); *C02F 2301/043* (2013.01); *C02F 2303/04* (2013.01)

(56) References Cited

U.S. PATENT DOCUMENTS

| | | | |
|---|---|---|---|
| 5,766,447 A * | 6/1998 | Creijghton | A61L 2/02 204/164 |
| 6,174,500 B1 * | 1/2001 | Uno | A61L 2/14 422/186.04 |
| 6,331,321 B1 * | 12/2001 | Robbins | A23L 2/48 426/231 |
| 2004/0217068 A1 * | 11/2004 | Kirby | B01F 3/0446 210/760 |
| 2005/0189278 A1 | 9/2005 | Iijima et al. | |
| 2010/0239473 A1 | 9/2010 | Iijima et al. | |
| 2013/0334955 A1 | 12/2013 | Saitoh et al. | |
| 2014/0014516 A1 | 1/2014 | Kumagai et al. | |
| 2014/0054242 A1 * | 2/2014 | Imai | C02F 1/4608 210/748.17 |
| 2014/0353223 A1 | 12/2014 | Nishimura et al. | |
| 2015/0136711 A1 * | 5/2015 | Fujikane | C02F 1/4608 210/748.17 |
| 2015/0225264 A1 * | 8/2015 | Fujikane | C02F 1/50 210/748.17 |
| 2015/0251933 A1 * | 9/2015 | Nakamura | C02F 1/4608 210/748.17 |

FOREIGN PATENT DOCUMENTS

| | | |
|---|---|---|
| JP | 61-025698 | 2/1986 |
| JP | 9-507428 | 7/1997 |
| JP | 2000-093967 | 4/2000 |
| JP | 2000-237755 | 9/2000 |
| JP | 2002-018446 | 1/2002 |
| JP | 2003-059914 | 2/2003 |
| JP | 2003-062579 | 3/2003 |
| JP | 2004-143519 | 5/2004 |
| JP | 2005-058887 | 3/2005 |
| JP | 2005-296909 | 10/2005 |
| JP | 2007-207540 | 8/2007 |
| JP | 3983282 | 9/2007 |
| JP | 4041224 | 1/2008 |
| JP | 2009-255027 | 11/2009 |
| JP | 4784624 | 10/2011 |
| JP | 4784624 B | 10/2011 |
| JP | 2012-011301 | 1/2012 |
| JP | 2012-075981 | 4/2012 |
| JP | 2012-101173 | 5/2012 |
| JP | 2012-164556 | 8/2012 |
| JP | 2012-204249 | 10/2012 |
| JP | 2012-217917 | 11/2012 |
| JP | 2013-061141 | 4/2013 |
| JP | 2013-150975 | 8/2013 |
| JP | 2013-211204 | 10/2013 |
| WO | 95/18768 | 7/1995 |
| WO | 2012/157248 | 11/2012 |

* cited by examiner

LIQUID TREATMENT APPARATUS AND LIQUID TREATMENT METHOD

CROSS REFERENCES TO RELATED APPLICATIONS

This application claims priority to Japanese Patent Application No. 2013-238038, filed on Nov. 18, 2013, the contents of which are hereby incorporated by reference.

BACKGROUND

1. Technical Field

The present disclosure relates to a liquid treatment apparatus and a liquid treatment method.

2. Description of the Related Art

Sterilizing apparatuses in which water such as polluted water is treated using plasma have been proposed. For example, the sterilizing apparatus disclosed in Japanese Patent No. 4784624 includes a high-voltage electrode and a ground electrode that are disposed with a space therebetween in water to be treated in a treatment tank. In the above-described sterilizing apparatus, a high-voltage pulse is applied to both electrodes to cause an electric discharge, which generates plasma in gas bubble formed due to an instantaneous boiling phenomenon. This creates OH, H, O, $O_2^-$, $O^-$, $H_2O_2$, which kill bacteria and germs contained in the water to be treated.

SUMMARY

There has been an issue that the conventional sterilizing apparatus has low liquid treatment efficiency.

Accordingly, the present disclosure provides a liquid treatment apparatus and a liquid treatment method with which an efficient liquid treatment may be achieved.

According to one aspect of the present disclosure, there is provided a liquid treatment apparatus including: a dielectric tube that defines a channel through which water to be treated flows, the channel being split upstream of the dielectric tube into at least a first channel and a second channel, the first channel and the second channel being merged with each other downstream of the dielectric tube; a first electrode at least partially disposed within the first channel; a second electrode at least partially disposed within the first channel; a first gas-supply unit that supplies gas to form a gas bubble into the water to be treated that flows through the first channel; and a first power-supply that applies a voltage between the first electrode and the second electrode.

The comprehensive and specific aspect described above may be implemented using the liquid treatment apparatus and the liquid treatment method in any combination.

The liquid treatment apparatus and the liquid treatment method according to the present disclosure allow an efficient liquid treatment to be achieved.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION OF THE EMBODIMENTS

According to one aspect of the present disclosure, there is provided a liquid treatment apparatus including a dielectric tube that defines a channel through which water to be treated flows, the channel being split upstream of the dielectric tube into at least a first channel and a second channel that are merged with each other downstream of the dielectric tube; a first electrode at least partially disposed within the first channel; a second electrode at least partially disposed within the first channel; a first gas-supply unit that supplies gas in order to form a gas bubble in the water to be treated that flows through the first channel; and a first power-supply that applies a voltage between the first electrode and the second electrode.

In the above-described liquid treatment apparatus, liquid, or water to be treated, that flows through the dielectric tube is split into the first channel and the second channel. This reduces the pressure inside the first channel, thereby reducing a pressure applied to the gas supply unit through the first channel. Therefore, in the above-described liquid treatment apparatus, reduction in the flow rate of gas supplied from the gas supply unit into the first channel, which is caused due to the pressure applied to the gas supply unit through the first channel, can be suppressed. As a result, the above-described liquid treatment apparatus allows an efficient liquid treatment to be achieved. In addition, the above-described liquid treatment apparatus may include, for example, a small pump having a low output, realizing reduction in the size of the apparatus.

In the present disclosure, the term "water to be treated" refers to liquid that is to be treated using the liquid treatment apparatus. Typically, the water to be treated contains germs and chemical substances such as organic matter. However, the water to be treated does not necessarily contain germs and/or chemical substances. In other words, in the present disclosure, the expression "treating liquid" refers to not only sterilizing liquid or decomposing chemical substances contained in liquid but also, for example, forming radicals in liquid that does not contain germs nor chemical substances.

In the above-described liquid treatment apparatus, for example, the first power-supply may apply the voltage applied between the first electrode and the second electrode, causing an electric discharge inside the gas bubble to generate plasma.

In such a case, when plasma is generated inside the gas bubble formed in the water to be treated in the first channel, radicals may be efficiently formed in the liquid treatment apparatus. Thus, the liquid treatment apparatus allows liquid treatment to be performed in a short period of time.

In the above-described liquid treatment apparatus, for example, the second electrode may be disposed upstream from the first electrode.

In such a case, plasma may be generated efficiently in the liquid treatment apparatus. Thus, the liquid treatment apparatus allows liquid treatment to be performed in a short period of time.

The above-described liquid treatment apparatus may further include, for example, an insulator surrounding the periphery of the first electrode with a space therebetween, the insulator having an opening through which the space communicates with the first channel of the dielectric tube. In addition, the first gas-supply unit may supply the gas into the space, to form the gas bubble through the opening into the water to be treated that flows through the first channel.

In such a case, a condition where the first electrode is covered with a gas bubble can be readily set in the liquid treatment apparatus. When plasma is generated under the condition, radicals are efficiently formed in the liquid treatment apparatus, allowing liquid treatment to be performed in a short period of time.

In the above-described liquid treatment apparatus, for example, the first electrode may include a metal electrode disposed in the first channel of the dielectric tube and a metal fixing portion with which the first electrode is fixed in place and which is connected to the power supply. The metal electrode and the metal fixing portion may be composed of different materials.

In such a case, in the liquid treatment apparatus, for example, the metal electrode may be composed of a metal material having high plasma resistance and the metal fixing portion may be composed of a metal material having good workability. This realizes the first electrode having plasma resistance and consistent properties with a low production cost.

In the above-described liquid treatment apparatus, for example, the metal fixing portion may have a through hole through which the gas is supplied from the gas supply unit into the space.

In such a case, in the liquid treatment apparatus, a condition where the first electrode is covered with the gas bubble can be readily set. When plasma is generated under the condition, radicals may be efficiently formed in the liquid treatment apparatus, allowing liquid treatment to be performed in a short period of time.

The above-described liquid treatment apparatus may further include, for example, an insulator disposed on the outer peripheral surface of the first electrode. The first electrode is a hollow tubular electrode having an opening, and a hollow space of the first electrode communicates an internal space of the dielectric tube through the opening. The first gas-supply unit may supply the gas into the space, to form the gas bubble through the opening into the water to be treated that flows through the first channel.

For example, at least part of the first electrode may include a region where a conductor surface thereof is exposed, and the gas supply unit may form the gas bubble in the water to be treated, to cause the region of the first electrode to be located within the gas bubble.

In such a case, in the liquid treatment apparatus, a condition where the first electrode is covered with gas may be readily set. When plasma is generated under the condition, radicals can be efficiently formed in the liquid treatment apparatus, allowing liquid treatment to be performed in a short period of time.

The above-described liquid treatment apparatus may further include, for example, a third electrode at least partially disposed within the second channel of the dielectric tube, and a fourth electrode at least partially disposed within the second channel of the dielectric tube. The first gas-supply unit may supply gas to form a gas bubble also into the water to be treated that flows through the second channel. The first power-supply may apply a voltage also between the third electrode and the fourth electrode.

In such a case, in the liquid treatment apparatus, plasma is generated also in the second channel of the dielectric tube in order to perform liquid treatment. As a result, the liquid treatment apparatus allows an efficient liquid treatment to be achieved even when the volume of liquid to be treated is large.

The above-described liquid treatment apparatus may further include, for example, a third electrode at least partially disposed within the second channel of the dielectric tube, a fourth electrode at least partially disposed within the second channel of the dielectric tube, the fourth electrode being disposed upstream from the third electrode, a second gas-supply unit that supplies gas to form a gas bubble in the water to be treated that flows through the second channel, and a second power-supply that applies a voltage between the third electrode and the fourth electrode.

In such a case, in the liquid treatment apparatus, the second gas-supply unit supplies gas into the second channel and the second power-supply applies a voltage between the third electrode and the fourth electrode. As a result, in the liquid treatment apparatus, plasma is efficiently generated also in the second channel in order to perform liquid treatment. Thus, in the liquid treatment apparatus, liquid treatment can be performed also in the second channel as well as in the first channel of the dielectric tube, which allows liquid having a large volume to be efficiently treated.

According to another aspect of the present disclosure, there is provided a liquid treatment method including the steps of: preparing a dielectric tube that defines a channel, the channel being split upstream of the dielectric tube into at least a first channel and a second channel, the first channel and the second channel being merged with each other downstream of the dielectric tube, a first electrode at least partially disposed within the first channel, and a second electrode at least partially disposed within the first channel; feeding water to be treated from an upstream side to a downstream side of the dielectric tube; supplying gas to form a gas bubble into the water to be treated that flows through the first channel; and applying a voltage between the first electrode and the second electrode.

By the above-described liquid treatment method, water to be treated, which flows through the dielectric tube, may be treated in a short period of time. Furthermore, in the above-described liquid treatment method, water to be treated is split into the first channel and the second channel of the dielectric tube, thereby reducing the pressure inside the first channel. This suppresses reduction in the flow rate of gas supplied into the first channel, the reduction in the flow rate of gas caused due to the pressure inside the first channel. As a result, an efficient liquid treatment may be achieved.

In the above-described liquid treatment method, for example, in the step of applying the voltage, an electric discharge may be caused inside the gas bubble to generate plasma.

In such a case, in the liquid treatment method, plasma is generated inside gas bubble formed in water to be treated in the first channel, allowing radicals to be efficiently formed. As a result, the liquid treatment method allows liquid treatment to be performed in a short period of time.

Underlying Knowledge Forming Basis of the Present Disclosure

As described above, the sterilizing apparatus disclosed in Japanese Patent No. 4784624, by causing an electric discharge between a columnar electrode and a plate-shaped ground electrode, instantaneously vaporizes liquid with an instantaneous boiling phenomenon and generates plasma. However, in order to cause an instantaneous boiling phenomenon, energy for vaporizing the liquid needs to be applied. This inhibits efficient generation of plasma, which disadvantageously increases the time for treating the liquid.

Furthermore, in the known sterilizing apparatus, since liquid treatment is performed with the electrodes disposed in a treatment tank that contains the water to be treated, it is impossible to reduce the size of the apparatus.

Accordingly, the inventors designed, as a study example, a liquid treatment apparatus that included a first electrode and a second electrode that were disposed in a dielectric tube, a gas supply unit connected to the first electrode, and a power supply that applied a voltage between the first electrode and the second electrode. This liquid treatment apparatus included a dielectric tube, thereby allowing the size of the apparatus to be reduced. However, in this liquid treatment apparatus, the higher the flow rate of the water to be treated through the dielectric tube, the higher the flow speed of the water to be treated, thereby increasing the pressure inside the dielectric tube. The pressure applied to the gas supply unit through the dielectric tube was increased, thereby reducing the flow rate of gas supplied from the gas supply unit into the water to be treated in the dielectric tube. This posed a problem that the liquid treatment apparatus of the study example may possibly have low liquid treatment efficiency. In order to address the problem, for example, in this liquid treatment apparatus, the output of the gas supply unit might be increased in order to increase the flow rate of gas supplied from the gas supply unit into the water to be treated that flowed through the dielectric tube. However, when the gas supply unit was a pump, the size of the pump needed to be increased depending on the output of the gas supply unit. Thus, it was impossible to reduce the size of the apparatus.

Accordingly, the inventors devised a liquid treatment apparatus that included a dielectric tube defining a first channel in which a first electrode and a second electrode were disposed and a second channel through which the water to be treated was detoured. Thus, the present disclosure was made. In the above-described liquid treatment apparatus, the pressure inside the dielectric tube can be reduced, thereby reducing the pressure applied to the gas supply unit through the dielectric tube. This suppresses, in the liquid treatment apparatus, reduction in the flow rate of gas supplied from the gas supply unit into the dielectric tube, the reduction in the flow rate of gas caused due to the pressure applied to the gas supply unit through the dielectric tube. As a result, the liquid treatment apparatus according to the present disclosure allows both an efficient liquid treatment and reduction in the size thereof to be achieved.

Embodiments of the present disclosure are described below with reference to the accompanying drawings. Through all the drawings, the same or the equivalent components are denoted by the same reference numeral, and duplicated description thereof is omitted.

In the embodiments described below, comprehensive and specific examples are shown. The numbers, shapes, materials, components, the arrangements of the components, and the connection configuration of the components described in the following embodiments are provided just as examples but not intended to limit the present disclosure. Among the components described in the following embodiments, components that are not defined in independent claims that represent the broadest concept are described as optional components.

Embodiment 1

Overall Structure

The overall structure of a liquid treatment apparatus 100 according to Embodiment 1 of the present disclosure is described below.

Figure 1:
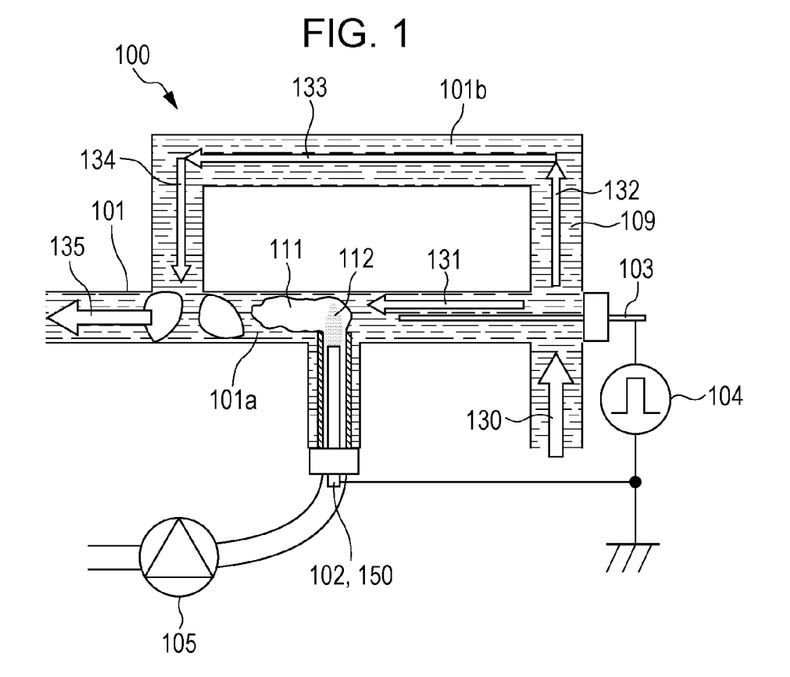
FIG. 1 schematically illustrates an example of the overall structure of a liquid treatment apparatus according to Embodiment 1 of the present disclosure.

FIG. 1 schematically illustrates an example of the overall structure of the liquid treatment apparatus 100 according to Embodiment 1 of the present disclosure. As shown in FIG. 1, the liquid treatment apparatus 100 according to Embodiment 1 includes a dielectric tube 101, a first electrode 102, a second electrode 103, a power supply 104, and a gas supply unit 105.

In the liquid treatment apparatus 100 according to Embodiment 1, as shown in FIG. 1, the first electrode 102 and the second electrode 103 are disposed inside the dielectric tube 101. The first electrode 102 is at least partially immersed in the water to be treated 109 that flows through the dielectric tube 101. The second electrode 103 is at least partially immersed in the water to be treated 109 that flows through the dielectric tube 101. The power supply 104 is connected between the first electrode 102 and the second electrode 103 and thereby applies a voltage therebetween. The gas supply unit 105, which supplies gas 110 to the first electrode 102 disposed inside the dielectric tube 101, is connected to the first electrode 102.

<Electrode Unit 150a Including the First Electrode>

An electrode unit 150 of the liquid treatment apparatus 100, which includes the first electrode 102, is described below. The electrode unit 150 may have a simple structure consisting of only the first electrode 102. The electrode unit 150 may also have any structure. For example, the electrode unit 150 may include an insulator surrounding the first electrode 102.

An electrode unit 150a is described below as an example of the electrode unit 150 including the first electrode 102. The electrode unit 150a includes an insulator 106 which surrounds the outer periphery of a first electrode 102a with a space 108 between the insulator 106 and the first electrode 102a.

Figure 2:
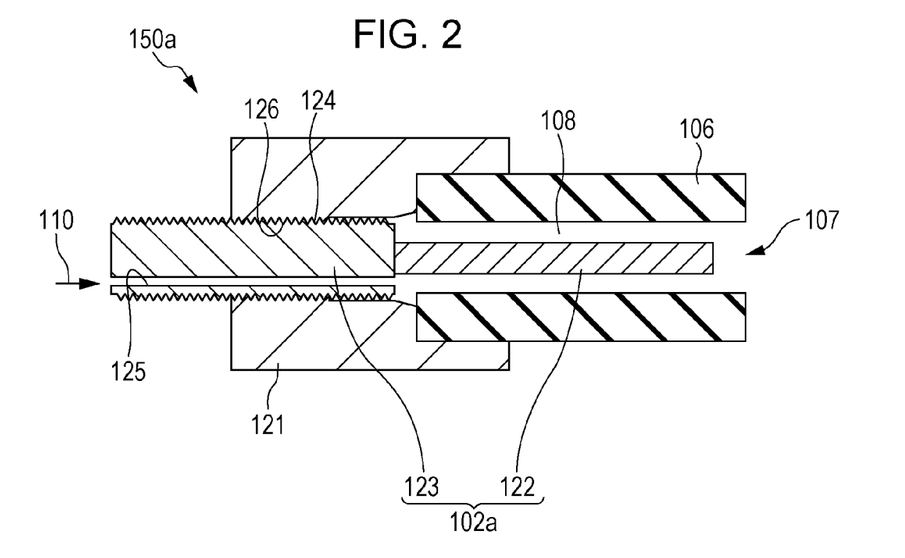
FIG. 2 is a cross-sectional view of an example of an electrode unit of a liquid treatment apparatus according to Embodiment 1 of the present disclosure.

FIG. 2 is a cross-sectional view of an example of the electrode unit 150a of the liquid treatment apparatus 100 according to Embodiment 1. The electrode unit 150a shown in FIG. 2 includes a first electrode 102a, an insulator 106, and a holding block 121.

The first electrode 102a includes a metal electrode 122 and a metal fixing portion 123. The metal electrode 122 is disposed inside the dielectric tube 101. The metal fixing portion 123 is firmly joined to the holding block 121 and connected to the power supply 104. The insulator 106 surrounds the outer periphery of the metal electrode 122 with the space 108 between the metal electrode 122 and the insulator 106. The insulator 106 has an opening 107 through which the inside of the dielectric tube 101 and the space 108 communicate with each other. The metal fixing portion 123 includes a screw part 124 formed in the outer peripheral surface thereof and a through hole 125 formed inside the metal fixing portion 123. The gas supply unit 105 supplies gas 110 into the space 108 through the through hole 125. The gas 110 is ejected, through the opening 107, into the water to be treated 109 in the form of a gas bubble 111. The holding block 121 includes a screw part 126 formed in the inner peripheral surface thereof. The screw part 126 combines with the screw part 124 of the metal fixing portion 123.

Specific examples of the components of the liquid treatment apparatus 100 are described below.

<Dielectric Tube>

The dielectric tube 101 defines channels including a first channel 101a and a second channel 101b. The dielectric tube 101 is split upstream thereof into the first channel 101a and the second channel 101b, both of which are merged with each other downstream thereof. The second channel 101b serves as a bypass through which part of the water to be treated 109 that flows through the dielectric tube 101 is detoured. The dielectric tube 101 may be, for example, a silicone hose that is a cylindrical tube having an inside diameter of 5 mm. The dielectric tube 101 may be formed in any shape and any size as long as it is tubular shape. Examples of the cross sectional shape of the dielectric tube 101 include a rectangle, a triangle, and other polygons. A material for the dielectric tube 101 is not limited to silicone, and any material may be used as long as it has plasma resistance and heat resistance.

The lengths and shapes of the channels of the dielectric tube 101 between the point at which the dielectric tube 101 is split into the first channel 101a and the second channel 101b and the point at which the first channel 101a and the second channel 101b are merged with each other, that is, the lengths and shapes of the first channel 101a and the second channel 101b are not limited. The shape of the dielectric tube 101 is not limited to a shape such that the second channel 101b serves as a bypass longer than the first channel 101a.

The ratio of the length of the dielectric tube 101 to the inside diameter thereof may be, for example, 5 or more. The inside diameter of the dielectric tube 101 may be, for example, 3 mm or more. In such a case, the inside diameter of the dielectric tube 101 is larger than the size of the plasma generation field, thereby suppressing damage to the dielectric tube 101 which is caused due to plasma. The inside diameter of the dielectric tube 101 may be, for example, 30 mm or less. In such a case, the size of the liquid treatment apparatus 100 may be reduced.

In Embodiment 1, as shown in FIG. 1, the water to be treated 109 flows through the dielectric tube 101 (arrow 130 in FIG. 1) and is then split upstream of the dielectric tube 101 into the direction of the first channel 101a (arrow 131) and the direction of the second channel 101b (arrow 132). Part of the water to be treated 109 which is detoured to the second channel 101b flows along the shape of the second channel 101b (arrow 133), is then merged with the other part of the water to be treated 109 which flows through the first channel 101a (arrow 134), and flows downstream of the dielectric tube 101 (arrow 135).

<First Electrode>

The first electrode 102a is at least partially disposed within the first channel 101a of the dielectric tube 101. As shown in FIG. 2, the first electrode 102a includes the metal electrode 122 and the metal fixing portion 123. The metal electrode 122 and the metal fixing portion 123 may be formed in different sizes and may be composed of different metals. The metal electrode 122 may be, for example, a columnar electrode having a diameter of 0.95 mm and may be composed of tungsten. The metal fixing portion 123 may be, for example, a columnar member having a diameter of 3 mm and may be composed of iron.

The diameter of the metal electrode 122 is set appropriately so as to allow plasma 112 to be generated and may be, for example, 2 mm or less. The shape of the metal electrode 122 is not limited to a columnar shape. The metal electrode 122 disposed inside the dielectric tube 101 may have a columnar shape in which the diameter of the electrode is substantially uniform from one end to the other end of the electrode. Such a columnar electrode suppresses excessive concentration of the electric field at the end thereof, compared with a needle-shaped electrode that becomes thinner toward the end thereof and that has substantially no thickness at the end thereof. Thus, a columnar electrode suppresses the degradation of the metal electrode 122 with use. A material for the metal electrode 122 is not limited to tungsten, and other metal materials having plasma resistance may also be used. Examples of the other metal materials for the metal electrode 122 include, although they may degrade the durability of the metal electrode 122, copper, aluminum, iron, platinum, and alloys of these metals. Optionally, a part of the surface of the metal electrode 122 may be thermally sprayed with yttrium oxide including a conductive material. The electric resistivity of yttrium oxide including a conductive material is, for example, 1 to 30 Ωcm. Thermal spraying with yttrium oxide increases the service life of the electrode.

The diameter of the metal fixing portion 123 is not limited to 3 mm and may be set appropriately as long as it is larger than the diameter of the metal electrode 122. A material for the metal fixing portion 123 is not limited and, for example, any metal material having good workability may be used. Examples of a material for the metal fixing portion 123 include copper, zinc, aluminum, tin, and brass, which are commonly used as materials for screws.

The first electrode 102a may be formed by, for example, press-fitting the metal electrode 122 into the metal fixing portion 123. Using the metal electrode 122 made of a plasma-resistant material and the metal fixing portion 123 made of an easily processed material, a first electrode 102a having plasma resistance and consistent properties with a low production cost can be realized.

A through hole 125 that communicates with the gas supply unit 105 may be formed inside the metal fixing portion 123. The through hole 125 also communicates with the space 108 between the insulator 106 and the metal electrode 122, allowing gas 110 to be supplied from the gas supply unit 105 into the space 108 through the through hole 125. The metal electrode 122 is covered with the gas 110 supplied through the through hole 125. The through hole 125 may be formed at a position below the metal fixing portion 123 in the direction of gravity. In this case, the metal electrode 122 is likely to be covered with the gas 110 from the gas supply unit 105. When two or more through holes 125 are provided, a pressure loss caused through the through holes 125 can be reduced. The diameter of the through hole 125 may be, for example, 0.3 mm. However, the shape and size of the through hole 125 are not limited to those described above.

A screw part 124 may be formed in the outer peripheral surface of the metal fixing portion 123. For example, when the screw part 124 formed in the outer peripheral surface of the metal fixing portion 123 is a male screw, a screw part 126 that is a female screw may be formed in the holding block 121. In such a case, the screw parts 124 and 126 combine with each other, and thereby the first electrode 102a is fixed to the holding block 121. Furthermore, rotating the metal fixing portion 123 allows the position of the end surface of the metal electrode 122 relative to the position of opening 107 of the insulator 106 to be adjusted with accuracy. In addition, the metal fixing portion 123 can be firmly joined to the power supply 104 through the screw part 124, which stabilizes the contact resistance between the power supply 104 and the first electrode 102a. This results in stabilization of the properties of the first electrode 102a. When the gas supply unit 105 is firmly joined to the first electrode 102a through the screw part 126, the joint between the gas supply unit 105 and the first electrode 102a can be assured. The above-described arrangement may contribute to a water-proofing measure and a safety measure required for achieving practical utilization of the liquid treatment apparatus.

The first electrode 102a may be disposed so that its longitudinal direction is directed to any direction relative to the flow direction (arrow 131 in FIG. 1) in which the water to be treated 109 flows through the first channel 101a of the dielectric tube 101. For example, the first electrode 102a may be arranged so that the flow direction in which the water to be treated 109 flows through the dielectric tube 101 intersects the side surface of the first electrode 102a. For example, as shown in FIG. 1, the first electrode 102a may be arranged so that its longitudinal direction intersects perpendicularly the flow direction (arrow 131 in FIG. 1) in which the water to be treated 109 flows through the dielectric tube 101. The arrangement of the first electrode 102a shown in FIG. 1 prevents a gas bubble 111 from being retained in the periphery of the first electrode 102a. The gas bubble 111 may be formed, for example, due to gas 110 supplied from the gas supply unit 105.

<Second Electrode>

The second electrode 103 is at least partially disposed within the first channel 101a of the dielectric tube 101. The second electrode 103 may be, for example, a columnar electrode having a diameter of 1 mm and may be composed of tungsten. However, the shape, size, and material of the second electrode 103 are not limited those described above. The second electrode 103 may be composed of any metal material having conductivity. Examples of such a material for the second electrode 103 include, similarly to the first electrode 102a, iron, tungsten, copper, aluminum, platinum, and an alloy containing one or more metals selected from these metals.

The distance between the first electrode 102a and the second electrode 103 may be, for example, 10 mm. The distance between the first electrode 102a and the second electrode 103 is not limited and may be set appropriately so as to allow plasma 112 to be generated. In the liquid treatment apparatus 100 including the dielectric tube 101, the smaller the cross-sectional area of a channel in which the water to be treated 109 flows, the higher the resistance of the electrical pathway between the first electrode 102a and the second electrode 103, which makes an electric discharge to be less likely to occur between the first electrode 102a and the second electrode 103. Accordingly, the distance between the electrodes may be set appropriately depending on the inside diameter of the dielectric tube 101 that defines the channel. The distance between the first electrode 102a and the second electrode 103 may be, for example, 1 mm or more and 15 mm or less. When the inside diameter of the dielectric tube 101 is 5 mm, the distance between the first electrode 102a and the second electrode 103 may be, for example, 5 mm or more and 15 mm or less.

The second electrode 103 may be disposed, for example, upstream from the first electrode 102a and inside the first channel 101a of the dielectric tube 101. In such a case, plasma 112 can be efficiently generated in the liquid treatment apparatus 100 according to Embodiment 1.

As described above, the distance between the first electrode 102a and the second electrode 103 is set small (e.g., 15 mm or less) in order to cause an electric discharge inside the dielectric tube 101. The channel of the dielectric tube 101 is likely to be filled with a gas bubble 111 formed inside the channels, compared with the case where a large-volume treatment tank is used. Thus, the smaller the distance between the first electrode 102a and the second electrode 103 and/or the higher the proportion of the volume occupied with the gas bubble 111 in the channels, the higher the probability of the second electrode 103 being covered with the gas bubble 111 that also covers the first electrode 102a. When both the first electrode 102a and the second electrode 103 are covered with the gas bubble 111 simultaneously, arc discharge is more likely to occur between the two electrodes, which makes it difficult to cause plasma to be consistently generated. In other words, although the liquid treatment apparatus 100 including the dielectric tube 101 allows reduction in the size thereof, there may be a risk of gas bubble 111 covering the first electrode 102a and the second electrode simultaneously, which may disturb consistent generation of plasma. On the other hand, when the second electrode 103 is disposed upstream from the first electrode 102a as shown in FIG. 1, gas bubble 111 formed in the periphery of the first electrode 102a are less likely to flow in the upstream direction in which the second electrode 103 is disposed. This prevents both the first electrode 102a and the second electrode 103 from being covered with gas bubble 111 simultaneously, thereby allowing consistent generation of plasma.

<Insulator>

The insulator 106 is disposed along the outer periphery of the metal electrode 122 of the first electrode 102a with a space 108 therebetween. Gas 110 is supplied from the gas supply unit 105 into the space 108 and then covers the metal electrode 122. Therefore, the outer peripheral surface of the metal electrode 122 is not brought into direct contact with the water to be treated 109 although a conductor-exposed part of the electrode, which is composed of a metal, is exposed at the outer peripheral surface of the metal electrode 122. The insulator 106 may be, for example, a hollow cylindrical member having an inside diameter of 1 mm. However, the size and shape of the insulator 106 are not limited to those described above.

The insulator 106 has an opening 107. The opening 107 defines the size of gas bubble 111 when the gas bubble 111 is formed in the water to be treated 109 that flows through the first channel 101a of the dielectric tube 101. Examples of a material for the insulator 106 include an alumina ceramic (aluminum oxide), magnesium oxide, yttrium oxide, an insulating plastic, glass, and quartz.

The opening 107 of the insulator 106 may be formed in the end surface of the insulator 106 as shown in FIG. 2 or may be formed in the side surface of the insulator 106. The position of the opening 107 is not particularly limited. A plurality of openings 107 may be formed in the insulator 106. The opening 107 of the insulator 106 may be, for example, a circle opening having a diameter of 1 mm. However, the shape and size of the opening 107 are not limited to those described above. The diameter of the opening 107 may be, for example, 0.3 to 2 mm.

<Power Supply>

The power supply 104 is disposed so as to apply a voltage between the first electrode 102a and the second electrode 103. The power supply 104 is capable of applying a pulsed voltage or an alternating voltage between the first electrode 102a and the second electrode 103. The waveform of the voltage may be, for example, a pulse wave, a half-sine wave, or a sine wave. The power supply 104 may apply a bipolar pulse voltage, that is, a pulsed voltage in which a positive pulsed voltage and a negative pulsed voltage are alternately applied. For example, the power supply 104 may be configured so that the output capacity is 80 VA and a peak no-load voltage is 10 kV.

<Gas Supply Unit>

The gas supply unit 105 is joined to the metal fixing portion 123 of the first electrode 102a. The gas supply unit 105 supplies gas 110 into the space 108 through the through hole 125 inside the metal fixing portion 123. Examples of the gas 110 supplied include air, He, Ar, and $O_2$. The flow rate of gas supplied from the gas supply unit 105 is not particularly limited. The gas supply unit 105 may be a gas supply unit that supplies gas at, for example, 1 liter/min. The gas supply unit 105 may be, for example, a pump. In an example shown in FIG. 2, the gas 110 supplied from the gas supply unit 105 forms the gas bubble 111, which covers the surface of the metal electrode 122 that is a conductor-exposed part of the first electrode 102a.

<Holding Block>

The holding block 121 is joined to the metal fixing portion 123 of the first electrode 102a and to the insulator 106. The holding block 121 may have a sealing structure in order to prevent the water to be treated 109 from being leaked at the joint between the first electrode 102a and the holding block 121 and/or the joint between the insulator 106 and the holding block 121. For example, a screw part 126 may be formed inside the holding block 121 in order to fix the metal fixing portion 123 of the first electrode 102a by screws. Another screw part (not shown) may be formed inside the holding block 121 in order to fix the insulator 106 by screws. The sealing structure of the holding block 121 is not limited to those described above, and any sealing structure may be employed.

In the present disclosure, the expression "the surface of the metal electrode 122 is not brought into direct contact with the water to be treated 109" means that the surface of the metal electrode 122 is not brought into contact with a large mass of liquid inside the dielectric tube 101. Therefore, "the metal electrode 122 is not brought into direct contact with the water to be treated 109" includes a condition where the surface of the metal electrode 122 has been wetted by the water to be treated 109 (i.e., technically, the surface of the metal electrode 122 is brought into contact with the water to be treated 109) and covered with gas of the gas bubble 111. Such a condition may occur when, for example, gas bubble is formed around the surface of the first electrode wetted by liquid.

<Operation (Liquid Treatment Method)>

An example of the operation of the liquid treatment apparatus 100 according to Embodiment 1, that is, an example of the liquid treatment method using the liquid treatment apparatus 100 according to Embodiment 1, is described below.

The water to be treated 109 is fed into the dielectric tube 101. The water to be treated 109 flows through the dielectric tube 101 (arrow 130 in FIG. 1) and is then split upstream of the dielectric tube 101 into the first channel 101a (arrow 131 in FIG. 1) and the second channel 101b (arrow 132 in FIG. 1). Part of the water to be treated 109 which is detoured to the second channel 101b flows along the shape of the second channel 101b (arrow 133 in FIG. 1), is merged with the other part of the water to be treated 109 that flows through the first channel 101a (arrow 134 in FIG. 1), and then flows downstream of the dielectric tube 101 (arrow 135 in FIG. 1).

The gas supply unit 105 supplies gas 110, through the through hole 125 of the first electrode 102a, into a space 108 between the insulator 106 and the metal electrode 122 of the first electrode 102a. The gas 110 supplied is ejected through the opening 107 of the insulator 106 into the water to be treated 109 that flows through the dielectric tube 101, thereby causing a gas bubble 111 to be formed in the water to be treated 109. The gas bubble 111 covers the metal electrode 122, conductor-exposed part, of the first electrode 102a. In other words, the gas bubble 111 are formed at the opening 107 of the insulator 106, and the surface of the metal electrode 122 of the first electrode 102a is always covered with the gas bubble 111 formed of the gas 110.

When the metal electrode 122 has been covered with the gas bubble 111, the power supply 104 applies a voltage between the first electrode 102a and the second electrode 103. The voltage applied between the first electrode 102a and the second electrode 103 causes an electric discharge inside the gas bubble 111. Due to the electric discharge, plasma 112 is generated in the vicinity of the metal electrode 122 of the first electrode 102a toward the inside of the gas bubble 111. The plasma 112 produces, for example, OH radicals in the water to be treated 109. OH radicals can sterilize the water to be treated 109 and/or decompose chemical matter contained in the water to be treated 109. The plasma 112 is generated not only inside the gas bubble 111 at the end of the first electrode 102a but also widely over the inner space 108. This is probably because the water to be treated 109 serves as an opposed electrode via the insulator 106. Due to the above-described effects, a large amount of ions can be produced, which leads to generation of a large amount of radicals in the water to be treated 109. This is a great advantage that is brought since the first electrode 102a is disposed inside the water to be treated 109 as described above. In addition, in the liquid treatment apparatus 100, long-lived OH radicals can be produced.

The "life" of OH radicals is herein determined as follows. The amount of OH radicals in the liquid is measured by electron spin resonance (ESR) at predetermined time intervals after generation of plasma 112 has been stopped. The half-life of the OH radicals is calculated on the basis of the change in the amount of OH radicals over time. The half-life of the OH radicals calculated as described above is herein referred to as the "life" of the OH radicals. The inventors have confirmed that OH radicals having a life of at least 5 minutes or more may be produced using an liquid treatment apparatus 100 of a reference example in Embodiment 1 described below.

In the liquid treatment apparatus 100 according to Embodiment 1, long-lived OH radicals can be produced in gas bubble 111 in the water to be treated 109. Therefore, in the liquid treatment apparatus 100, the water to be treated 109 can be treated even downstream of the dielectric tube 101 by causing the OH radicals in the gas bubble 111 to react with germs and/or chemical substances contained in the water to be treated 109. Thus, part of the water to be treated 109 which has flowed through the second channel 101b of the dielectric tube 101 can also be treated downstream of the dielectric tube 101 after it is merged with the other part of the water to be treated 109 that has flowed through the first channel 101a.

<Relationship between the Pressure inside the First Channel and the Liquid Treatment Effect>

The one of effects produced by the liquid treatment apparatus 100 according to Embodiment 1 is described below. In the liquid treatment apparatus 100 according to Embodiment 1, the dielectric tube 101 defines the first channel 101a and the second channel 101b. The water to be treated 109 that flows through the dielectric tube 101 is split into the first channel 101a and the second channel 101b. In the first channel 101a, the first electrode 102a and the second electrode 103 are disposed. The second channel 101b serves as a bypass for the first channel 101a. As a result, in the liquid treatment apparatus 100, the pressure inside the first channel 101a of the dielectric tube 101 can be reduced, thereby reducing the pressure applied to the gas supply unit 105 through the first channel 101a of the dielectric tube 101. When a large amount of the water to be treated 109 is treated, for example, the liquid treatment apparatus 100 can suppress reduction in the flow rate of gas supplied from the gas supply unit 105 into the first channel 101a, the reduction in the flow rate caused due to the pressure applied to the gas supply unit 105 through the first channel 101a. As a result, the liquid treatment apparatus 100 allows an efficient liquid treatment to be achieved.

Figure 3:
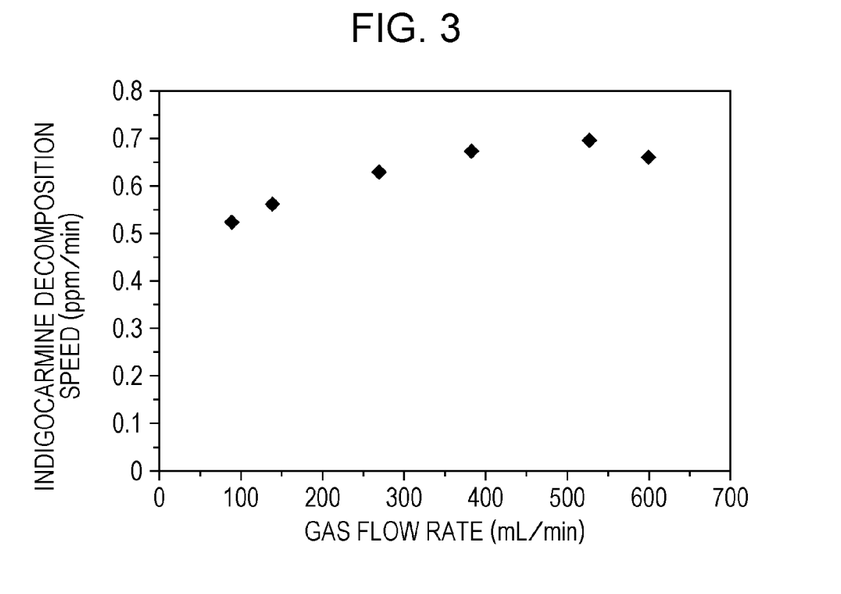
FIG. 3 shows an example of the relationship between the flow rate of gas supplied from a gas supply unit and the decomposition speed of indigocarmine, which was determined using a liquid treatment apparatus of Reference Example A.

The relationship between the flow rate of gas supplied from the gas supply unit 105 and the treatment speed, or decomposition speed, of the water to be treated is described below. FIG. 3 shows an example of the relationship between the flow rate of gas supplied from the gas supply unit 105 and the decomposition speed of indigocarmine, which was determined using the liquid treatment apparatus of Reference Example A described below. The decomposition speed of indigocarmine was calculated from the time elapsed from the start of treatment of an indigocarmine solution using the liquid treatment apparatus of Reference Example A until decomposition of indigocarmine.

Reference Example A

A liquid treatment apparatus 100 prepared in Reference Example A had the same structure as the overall structure shown in FIG. 1 except that the dielectric tube 101 did not include the second channel 101b. The liquid treatment apparatus 100 of Reference Example A included the electrode unit 150a shown in FIG. 2. The dielectric tube 101 was a silicone hose that was a cylindrical tube having an inside diameter of 5 mm. A metal electrode 122 of a first electrode 102 was a columnar electrode having a diameter of 0.95 mm and composed of tungsten. A metal fixing portion 123 of the first electrode 102 was a columnar electrode having a diameter of 3 mm and was composed of iron. The diameter of a through hole 125 formed in the metal fixing portion 123 of the first electrode 102 was 0.3 mm. An insulator 106 was a hollow cylindrical member having an inside diameter of 1 mm and was composed of an alumina ceramic (aluminum oxide). The diameter of an opening 107 formed in the insulator 106 was 1 mm. A second electrode 103 was a columnar electrode having a diameter of 1 mm and was composed of tungsten. The distance between the first electrode 102a and the second electrode 103 was 10 mm. A power supply 104 had an output capacity of 80 VA and a peak no-load voltage of 10 kV.

As shown in FIG. 3, the decomposition speed reached its peak when the gas flow rate was about 500 mL/min, and the decomposition speed was reduced with reduction in the gas flow rate. The test results show that it is possible to improve liquid treatment efficiency by controlling the flow rate of gas supplied from the gas supply unit 105 to an optimal value.

In a liquid treatment apparatus in which the dielectric tube 101 does not include the second channel 101b, that is, the dielectric tube 101 defines only the first channel 101a, as in Reference Example A, the higher the flow rate of the water to be treated 109, the higher the flow speed of the water to be treated 109 that flows through the dielectric tube 101, thereby increasing the pressure inside the dielectric tube 101. The increase in the pressure inside the dielectric tube 101 increases the pressure applied to the gas supply unit 105 through the dielectric tube 101, reducing the flow rate of gas supplied from the gas supply unit 105 into the water to be treated 109 that flows through the dielectric tube 101. In other words, in a liquid treatment apparatus that does not include the second channel 101b, the gas supply unit 105 may fail to supply the gas 110 into the water to be treated 109 at a desired flow rate (e.g., 500 mL/min, at which the treating speed reaches its peak in FIG. 3). As a result, an efficient liquid treatment may fail to be achieved. In order to address the issue, for example, the output of the gas supply unit 105 may be increased so that the gas supply unit 105 can supply the gas 110 into the water to be treated 109 at the desired flow rate. However, when the gas supply unit 105 is, for example, a pump, the size of pump is increased depending on the level of the output required. This disadvantageously inhibits reduction in the size of the apparatus.

On the other hand, in the liquid treatment apparatus 100 according to Embodiment 1, part of the water to be treated 109 is detoured to the second channel 101b of the dielectric tube 101, bypassing the first channel 101a. This reduces the pressure inside of the first channel 101a, thereby reducing the pressure applied to the gas supply unit 105 through the first channel 101a. This allows the gas supply unit 105 to supply the gas 110 into the water to be treated 109 that flows through the first channel 101a at a desired flow rate. As a result, the water to be treated may be efficiently treated using the liquid treatment apparatus 100 according to Embodiment 1. In the liquid treatment apparatus 100 according to Embodiment 1, the pressure applied to the gas supply unit 105 through the dielectric tube 101 is reduced due to the structure of the dielectric tube 101. Therefore, the liquid treatment apparatus 100 may include, for example, a small pump having a low output that serves as the gas supply unit 105. In other words, the size of the liquid treatment apparatus 100 according to Embodiment 1 may be reduced.

<Liquid Treatment Effect at a Position Distant from the Plasma Generation Field>

The effect of the liquid treatment apparatus 100 according to Embodiment 1 is described below.

Typically, it is considered that the germs and/or chemical substances contained in the water to be treated 109 are decomposed at the interface between the plasma and liquid, referred to as "plasma generation field". However, the inventors consider that decomposition of the germs and/or chemical substances occurs not only in the plasma generation field but also in the water to be treated 109 due to the collision of radicals inside the water to be treated 109 with the germs and/or chemical substances floating therein. Since the liquid treatment apparatus 100 according to Embodiment 1 allows long-lived radicals to be produced, it is considered that, in the liquid treatment apparatus 100 according to Embodiment 1, the germs and/or chemical substances may be decomposed not only in the plasma generation field but also in the water to be treated 109 by bringing the germs and/or chemical substances into contact with the water which has treated.

In the liquid treatment apparatus 100 according to Embodiment 1, the contribution degree of the decomposition in the plasma generation field to the liquid treatment effect is not large as shown below.

Figure 4:
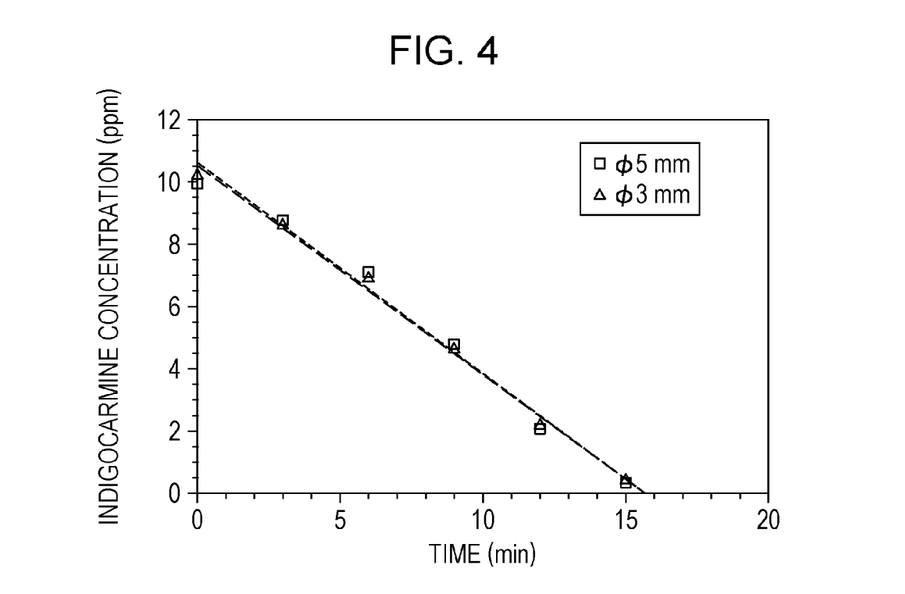
FIG. 4 shows an example of a difference in changes in indigocarmine concentrations over time which results from a difference in the inside diameters of dielectric tubes, which was determined using liquid treatment apparatuses of Reference Examples B and C.

Firstly, a difference in the decomposition speed of the water to be treated 109 which results from a difference in the inside diameter of the dielectric tube 101 is described below with reference to FIG. 4. FIG. 4 shows temporal changes of indigocarmine concentrations in the liquid treatment apparatuses of Reference Examples having different inside diameters of the dielectric tubes 101. In FIG. 4, the white triangles denote the test results obtained when the water to be treated 109 was treated using the liquid treatment apparatus 100 that included the dielectric tube 101 having an inside diameter of 3 mm. In FIG. 4, the white rectangles denote the test results obtained when the water to be treated 109 was treated using the liquid treatment apparatus 100 that included the dielectric tube 101 having an inside diameter of 5 mm. In the test, an indigocarmine solution was used as the water to be treated 109. The indigocarmine solution was supplied from a beaker into the dielectric tube 101 of each liquid treatment apparatus 100, and then treated in the dielectric tube 101 while circulating therethrough several times. Specifically, a cycle in which the indigocarmine solution was supplied from the beaker into a liquid-supply port of the dielectric tube 101, passed through the dielectric tube 101, and was drained from a liquid-drain port of the dielectric tube 101 into the beaker was repeated a plurality of times in order to circulate the indigocarmine solution. Hereinafter, such a circulation may be referred to as "beaker circulation". In the test, an indigocarmine solution of 500 ml was supplied form a beaker into each liquid treatment apparatus 100. Hereinafter, a test in which beaker circulation was conducted using a liquid treatment apparatus 100 including a dielectric tube 101 having an inside diameter of 3 mm may be referred to as "Reference Example B", and a test in which beaker circulation was conducted using a liquid treatment apparatus 100 including a dielectric tube 101 having an inside diameter of 5 mm may be referred to as "Reference Example C". Other conditions set in Reference Examples B and C were the same as in Reference Example A. Specifically, in the liquid treatment apparatuses 100 used in Reference Examples B and C, the dielectric tube 101 included the first channel 101a but did not include the second channel 101b. The flow rate of gas supplied from the gas supply unit 105 was set to 0.2 liter/min.

When Reference Example B in which the inside diameters of the dielectric tubes 101 were set to 3 mm and Reference Example C in which the inside diameters of the dielectric tubes 101 were set to 5 mm are compared, there is substantially no difference between indigocarmine decomposition speeds measured in Reference Examples B and C. The test results shows that the indigocarmine decomposition speed was independent of the inside diameter of the dielectric tube 101.

Hereinafter, a cross section of the dielectric tube 101 taken along a plane which passes an area near the first electrode 102a where plasma 112 is generated and which intersects perpendicularly the flow direction (arrow 131) of the water to be treated 109 through the first channel 101a of the dielectric tube 101 may be referred to as "cross section of a dielectric tube". In Reference Examples B and C, the plasma generation field was a region having a diameter of less than 3 mm, and therefore the plasma generation field was smaller than the cross section of the dielectric tube. Since the inside diameter of the dielectric tube 101 in Example B was smaller than in Reference Example C, the proportion of the area occupied by the plasma generation field in the cross section of the dielectric tube in Reference Example B was larger than in Reference Example C. That is, in Reference Example B, the proportion of the amount of indigocarmine solution that passed through the plasma generation field in the total amount of indigocarmine solution that passed through the dielectric tube 101 was larger than in Reference Example C. Therefore, in Reference Example B, the indigocarmine solution was more likely to be subjected to the decomposition effect in the plasma generation field than in Reference Example C. However, as shown in FIG. 4, a comparison of the test results of Reference Examples B and C shows no difference between the decomposition speeds thereof. As a result, it is considered that the amount of indigocarmine that reacted with radicals in the plasma generation field was remarkably small compared with those that reacted with radicals over the entire channel. In other words, in the liquid treatment apparatuses 100 used in Reference Examples B and C, the contribution degree of the decomposition effect in the plasma generation field is considered to be extremely small as compared with that of the decomposition effect over the entire channel.

Secondly, a difference in the decomposition speeds of the water to be treated 109 which results from a difference in methods for circulating the water to be treated 109, which was determined using the liquid treatment apparatus of Reference Examples, is described with reference to FIG. 5.

Figure 5:
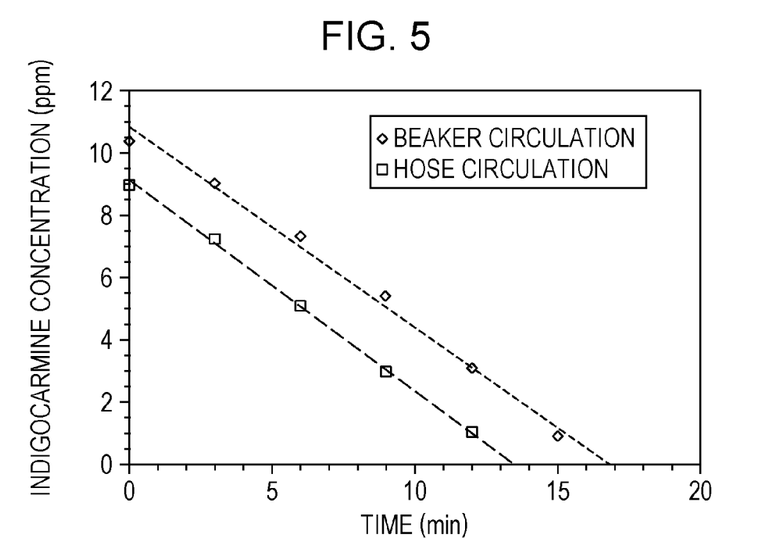
FIG. 5 shows an example of a difference in changes in indigocarmine concentrations over time which results from a difference in methods for circulating water to be treated, which was determined using liquid treatment apparatuses of Reference Examples D and E.

FIG. 5 shows temporal changes of indigocarmine concentrations in different methods for circulating the water to be treated 109. In FIG. 5, the white rhombuses denote the test results of Reference Example D, in which beaker circulation was conducted using the same liquid treatment apparatus as in Reference Example A. In FIG. 5, the white rectangles denote the test results of Reference Example E, in which hose circulation was conducted using the same liquid treatment apparatus as in Reference Example A. In the test, an indigocarmine solution was used as the water to be treated 109. The beaker circulation was a method in which 500 ml of an indigocarmine solution was supplied from a beaker into the dielectric tube 101 of the liquid treatment apparatus 100 a plurality of times in order to circulate the indigocarmine solution. The hose circulation was a method in which 500 ml of an indigocarmine solution was circulated through the dielectric tube 101 and a hose, the hose connecting a liquid-drain port of the dielectric tube 101 of to the liquid-supply port thereof. Difference between the beaker circulation and the hose circulation results in the number of times that the indigocarmine solution was passed through the dielectric tube 101. For example, in the beaker circulation, the indigocarmine solution was passed through the dielectric tube 101 a plurality of times per minute while, in the hose circulation, the indigocarmine solution was passed through the dielectric tube 101 once per minute. In other words, the number of times that the indigocarmine solution was passed through the plasma generation field near the first electrode 102a in the beaker circulation was larger than in the hose circulation.

As shown in FIG. 5, when Reference Example D in which beaker circulation was conducted and Reference Example E in which hose circulation was conducted are compared, there is substantially no difference in the indigocarmine decomposition speed. In other words, even when the number of times that the indigocarmine solution was passed through the plasma generation field was changed, the indigocarmine decomposition speed was not substantially changed. This test results show that, in the liquid treatment apparatuses 100 used in Reference Examples D an E, the amount of indigocarmine that reacted with radicals in the plasma generation field was extremely small, as compared with the amount of indigocarmine that reacted with radicals over the entire channel. Thus, the test results also show that, in the liquid treatment apparatus 100, the contribution degree of the decomposition in the plasma generation field to the decomposition over the entire channel was small.

In the liquid treatment apparatus 100 according to Embodiment 1, the same plasma generation system as in Reference Examples B to E above may be employed. Thus, also in the liquid treatment apparatus 100 according to Embodiment 1, liquid may be treated also in a region other than the plasma generation field as in Reference Examples B to E above. Specifically, it is considered that, in the liquid treatment apparatus 100 according to Embodiment 1, the reaction of radicals with germs and/or chemical substances may occur, for example, downstream of the dielectric tube 101 as well as in the plasma generation field. This is presumably because the liquid treatment apparatus 100 according to Embodiment 1 allows long-lived radicals to be produced.

The liquid treatment apparatus 100 according to Embodiment 1 allows long-lived radicals to be produced. When the water to be treated 109 is supplied into the dielectric tube 101 of the liquid treatment apparatus 100 a plurality of times, or when the water to be treated 109 circulates therein, the water to be treated 109 containing the long-lived radicals may be passed through the entire dielectric tube 101. This enables the water to be treated 109 containing the long-lived radicals to be passed also through second channel 101b of the dielectric tube 101. This promotes, in the liquid treatment apparatus 100 according to Embodiment 1, the reaction of the radicals with the germs contained in the water to be treated 109 over the entire dielectric tube 101.

In the liquid treatment apparatus 100 according to Embodiment 1, the reaction of the radicals with the germs contained in the water to be treated 109 proceeds not only at the position where plasma 112 is generated but also in a channel located downstream of the position in the dielectric tube 101. Therefore, even when the water to be treated 109 is not circulated through the dielectric tube 101, part of the water to be treated 109 which has detoured to the second channel 101b is brought into contact with the radicals, which has produced in other part of the water to be treated 109 in the first channel 101a, after merge of their channels downstream of the dielectric tube 101. Thus, using the liquid treatment apparatus 100 according to Embodiment 1, the water to be treated 109 may be treated to a sufficient degree even when the water to be treated 109 is not circulated through the dielectric tube 101. Alternatively, a treated liquid drained from the dielectric tube 101 of the liquid treatment apparatus 100 may be brought into contact with another liquid that has not yet been treated and contains germs and/or chemical substances, so that germs and/or chemical substances in the other liquid can bring into contact with radicals contained in the treated liquid.

<Liquid Treatment Effect of the Dielectric Tube>

The test results related to the decomposition speeds observed when liquid was treated using a liquid treatment apparatus used in Reference Examples F and G are described below. The liquid treatment apparatus used in Reference Examples F included a dielectric tube 101. The liquid treatment apparatus used in Reference Example G included a treatment tank instead of a dielectric tube. In each test, indigocarmine solution was treated using the liquid treatment apparatus and the time elapsed from the start of treatment of the indigocarmine solution until decomposition of indigocarmine was measured.

Reference Example F

The same liquid treatment apparatus as in Reference Example A was used. Specifically, the dielectric tube 101 of Reference Example F included only the first channel 101a. The flow rate of gas supplied from the gas supply unit 105 was set to 0.2 liter/min.

Reference Example G

Reference Example G is described below. The liquid treatment apparatus of Reference Example G was different from that of Reference Example F in that it included a treatment tank having a larger volume than the dielectric tube 101. The liquid treatment apparatus of Reference Example G included a first electrode 102a and a second electrode 103 disposed inside the treatment tank filled with the water to be treated 109. The volume of the treatment tank used in Reference Example G was 0.2 liters. Other structure and conditions of the liquid treatment apparatus of Reference Example G were the same as those in Reference Example A.

Figure 6:
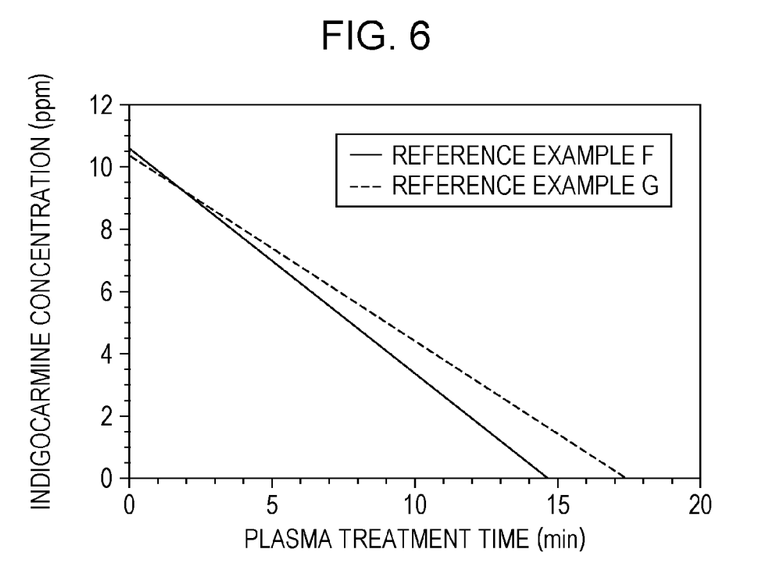
FIG. 6 shows changes in indigocarmine concentrations over time, which were determined using liquid treatment apparatuses of Reference Examples F and G.

FIG. 6 shows temporal changes of indigocarmine concentrations in Reference Examples F and G. In FIG. 6, the vertical axis represents indigocarmine concentration (ppm) and the horizontal axis represents time (min). In FIG. 6, the dotted line represents the test results of Reference Example G and the solid line represents the test results of Reference Example F.

As shown in FIG. 6, a comparison of the decomposition speeds observed in Reference Examples F and G shows that the decomposition speed observed in Reference Example F was higher than that observed in Example G. This is presumably because, in Reference Example F, the OH radicals produced by plasma 112 were more likely to be brought into contact with indigocarmine contained in the solution than in Reference Example G. Details are described below.

Reference Example G is described below. In Reference Example G, the water to be treated 109 in a treatment tank was subjected to liquid treatment. In Reference Example G, a gas bubble 111 was formed in the indigocarmine solution filled in the treatment tank, and plasma 112 was generated inside the gas bubble 111 in order to produce OH radicals. However, in Reference Example G, although the OH radicals were likely to be brought into contact with indigocarmine in the vicinity of the first electrode 102a where plasma 112 was generated, OH radicals were less likely to be brought into contact with indigocarmine at positions other than the vicinity of the first electrode 102a in the treatment tank. This is presumably because, in Reference Example G, the indigocarmine solution was retained in the treatment tank and accordingly the OH radicals were also retained in the vicinity of the first electrode 102a. Thus, it is considered that, in Reference Example G, one regions where a reaction between OH radicals and indigocarmine was likely to be caused and the other regions where the reaction was less likely to be caused coexisted in the treatment tank, thereby inhibiting an efficient treatment of the water to be treated 109.

Reference Example F is described below. In Reference Example F, an indigocarmine solution was fed into a dielectric tube 101 having an inside diameter of 5 mm, to perform liquid treatment. In Reference Example F, a large amount of gas bubbles 111 were present downstream from the first electrode 102a among the channels of the dielectric tube 101. It is considered that, in Reference Example F, this facilitated the indigocarmine solution flowed downstream of the first electrode 102a, easily brought into contact with gas bubble 111, and brought in to contact with OH radicals in the vicinity of the interface between the indigocarmine solution and the gas bubble 111. It is considered that, in Reference Example F, this promoted the reaction between OH radicals and indigocarmine, which resulted in a higher decomposition speed than in Reference Example G.

The liquid treatment apparatus 100 according to Embodiment 1 includes the same dielectric tube 101 as that used in Reference Example F above and the second channel 101b. Therefore, using the liquid treatment apparatus 100 according to Embodiment 1, OH radicals can be efficiently produced by plasma 112 as in Reference Example F. Furthermore, an efficient reaction between OH radicals and germs and/or chemical substances contained in the water to be treated 109 may be achieved, thereby allowing the water to be treated 109 to be treated in a short period of time.

In the example shown in FIG. 1, the second electrode 103 is located upstream from the first electrode 102a, and the first electrode 102a is arranged so that its longitudinal direction intersects perpendicularly the flow direction 131 of the water to be treated 109 thorough the first channel 101a of the dielectric tube 101. This prevents gas bubble 111 formed in the vicinity of the first electrode 102a from being brought into contact with the second electrode 103. This allows an electric discharge (glow discharge) to consistently occur upon application of a voltage between the first electrode 102a and the second electrode 103. Thus, the above-described arrangement of the first electrode 102a and the second electrode 103 allows plasma 112 to be consistently generated. The arrangement of the first electrode 102a and the second electrode 103 shown in FIG. 1 also prevents the gas bubble 111 from being retained in the vicinity of the first electrode 102a and thus causes the gas bubble 111 to flow downstream of the dielectric tube 101. This allows heat due to generation of the plasma 112 to be dissipated efficiently, which advantageously facilitates cooling of the liquid treatment apparatus.

In the example shown in FIG. 1, the first electrode 102a is arranged so that its longitudinal direction intersects perpendicularly the flow direction 131 of the water to be treated 109 through the first channel 101a of the dielectric tube 101. However, the arrangement of the first electrode 102a is not limited to this. The first electrode 102a may be disposed, for example, in the first channel 101a of the dielectric tube 101 so that the longitudinal direction of the first electrode 102a intersects the flow direction 131 of the water to be treated 109 at 45 degrees. The first electrode 102a may be arranged at any angle relative to the flow direction 131 of the water to be treated 109 as long as gas bubble 111 are not retained in the vicinity of the first electrode 102a.

In the example shown in FIG. 1, the second electrode 103 is arranged so that its longitudinal direction is aligned with the flow direction 131 of the water to be treated 109 through the first channel 101a of the dielectric tube 101. However, the arrangement of the second electrode 103 is not limited to this. The second electrode 103 may be disposed, for example, at any position as long as it is located upstream from the first electrode 102a. The angle at which the second electrode 103 is arranged relative to the flow direction 131 of the water to be treated 109 is not particularly limited.

The distance between the first electrode 102a and the second electrode 103 is not limited and may be set appropriately so as to allow generation of plasma 112. The distance between the first electrode 102a and the second electrode 103 may be, for example, 10 mm.

Embodiment 2

The liquid treatment apparatus according to Embodiment 2 is described below.

In Embodiment 2, only components that differ from Embodiment 1 are described, and description of the same components as in Embodiment 1 is omitted.

Figure 7:
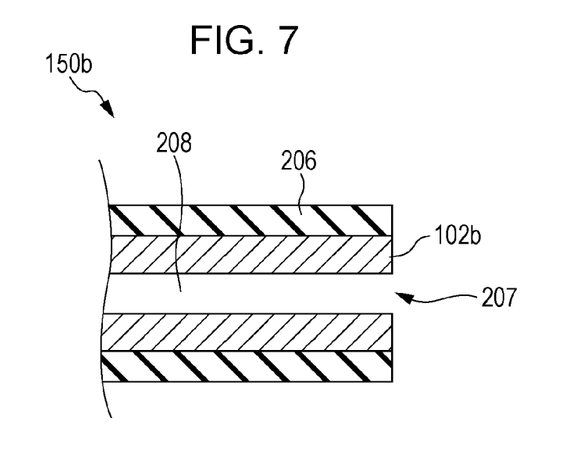
FIG. 7 is a cross-sectional view of an example of an electrode unit of a liquid treatment apparatus according to Embodiment 2 of the present disclosure.

FIG. 7 shows a cross section of an example of the electrode unit 150b of the liquid treatment apparatus according to Embodiment 2. As shown in FIG. 7, the electrode unit 150b according to Embodiment 2 includes an insulator 206 arranged to cover the first electrode 102b. In Embodiment 2, the shape of the first electrode 102b and the arrangement of the insulator 206 are changed from those in Embodiment 1. Other components in Embodiment 2 are the same as in Embodiment 1. Thus, the electrode unit 150b used in Embodiment 2 is described below.

<Electrode Unit 150b Including the First Electrode>

As shown in FIG. 7, the electrode unit 150b according to Embodiment 2 includes a first electrode 102b and an insulator 206. The first electrode 102b is a metal hollow cylindrical electrode. The inside diameter of the first electrode 102b may be, for example, 0.4 mm. The outside diameter of the first electrode 102b may be, for example, 0.6 mm. The first electrode 102b has opening 207 formed in the end thereof, and a hollow space 208 inside the first electrode 102b. The insulator 206 is disposed on the outer peripheral surface of the first electrode 102b without a gap between the insulator 206 and the first electrode 102b. A metal portion is exposed only at the end surface and inner peripheral surface of the first electrode 102b. Since the insulator 206 is disposed in contact with the outer peripheral surface of the first electrode 102b, the outer peripheral surface of the first electrode 102b is prevented from being brought into direct contact with the water to be treated 109. The thickness of the insulator 206 may be, for example, 0.1 mm.

<Operation (Liquid Treatment Method)>

An example of the operation of the liquid treatment apparatus according to Embodiment 2, that is, a liquid treatment method using the liquid treatment apparatus according to Embodiment 2, is described below.

The water to be treated 109 is fed into the dielectric tube 101. The water to be treated 109 flows through the dielectric tube 101 (arrow 130 in FIG. 1) and is then split upstream of the dielectric tube 101 into the first channel 101a (arrow 131 in FIG. 1) and the second channel 101b (arrow 132 in FIG. 1). Part of the water to be treated 109 which is detoured to the second channel 101b flows along the shape of the second channel 101b (arrow 133 in FIG. 1) and is then merged with the other part of the water to be treated 109 which flows through the first channel 101a (arrow 134 in FIG. 1). After being merged, the water to be treated 109 flows downstream of the dielectric tube 101 (arrow 135 in FIG. 1).

The gas supply unit 105 supplies gas 110 into the space 208 of the first electrode 102b. The gas 110 is ejected through the opening 207 of the first electrode 102b into the water to be treated 109 that flows through the dielectric tube 101, thereby causing gas bubble 111 to be formed in the water to be treated 109 that flows through the first channel 101a of the dielectric tube 101. The opening 207 of the first electrode 102b is covered with the gas 110 contained in the gas bubble 111. The gas bubble 111 is formed over a certain distance from the opening 207 of the first electrode 102b. Thus, in Embodiment 2, the opening 207 of the first electrode 102b serves as a gas bubble generator. By controlling the flow rate of the gas 110 supplied from the gas supply unit 105, a part in the vicinity of the opening 207 of the first electrode 102b, or the end surface of the first electrode 102b at which a metal portion is exposed, can be covered with the gas contained in the gas bubble 111. The gas bubble 111 covering the end surface of the first electrode 102b are defined not only by the gas-liquid interface between the gas 110 in the gas bubble 111 and the surrounding water to be treated 109 but also by the interface between the gas 110 in the gas bubble 111 and the insulator 206. In other words, the gas-liquid interface that defines the gas bubble 111 is not "enclosed" within the water to be treated 109. The gas bubble 111 is brought into contact with the insulator 206 in the vicinity of the opening 207 of the first electrode 102b. As described above, on the outer surface of the first electrode 102b, a conductor is exposed only at the end surface of the first electrode 102b in the vicinity of opening 207. Therefore, when the gas bubble 111 covering the end surface of the first electrode 102b is formed, the outer surface of the first electrode 102b is isolated from the water to be treated 109 by the gas bubble 111 and the insulator 206. Since the inner peripheral surface of the first electrode 102b is covered with the gas 110 when the gas bubble 111 is formed, it is not brought into direct contact with the water to be treated 109.

The power supply 104 applies a voltage between the first electrode 102b and the second electrode 103 when the conductor-exposed part of the first electrode 102b is covered with the gas bubble 111. Application of a voltage between the first electrode 102b and the second electrode 103 causes an electric discharge inside the gas bubble 111, thereby generating plasma in the vicinity of the first electrode 102b. Plasma spreads over the entire gas bubble 111. In particular, plasma 112 is generated at a high density in the vicinity of the first electrode 102b. Plasma is generated also in the hollow space 208 of the first electrode 102b. Thus, not only the edge but also the entirety of the electrode may be efficiently used for generating plasma.

Effect

The liquid treatment apparatus according to Embodiment 2 includes the electrode unit 150b including the first electrode 102b and the gas supply unit 105 that supplies gas 110 into the space 208 of the first electrode 102b. This allows, in the liquid treatment apparatus according to Embodiment 2, gas bubble 111 to be formed through the opening 207 of the first electrode 102b. Then, in the liquid treatment apparatus according to Embodiment 2, an electric discharge is caused inside the gas bubble 111 to generate plasma 112, thereby allowing long-lived OH radicals to be produced. Thus, also in Embodiment 2, plasma 112 can be generated efficiently inside the gas bubble 111, thereby allowing the water to be treated 109 to be treated in a short period of time.

Embodiment 3

The liquid treatment apparatus 100a according to Embodiment 3 is described below.

In Embodiment 3, only components that differ from Embodiment 1 or 2 are described. Description of the same components as in Embodiment 1 or 2 is omitted.

Figure 8:
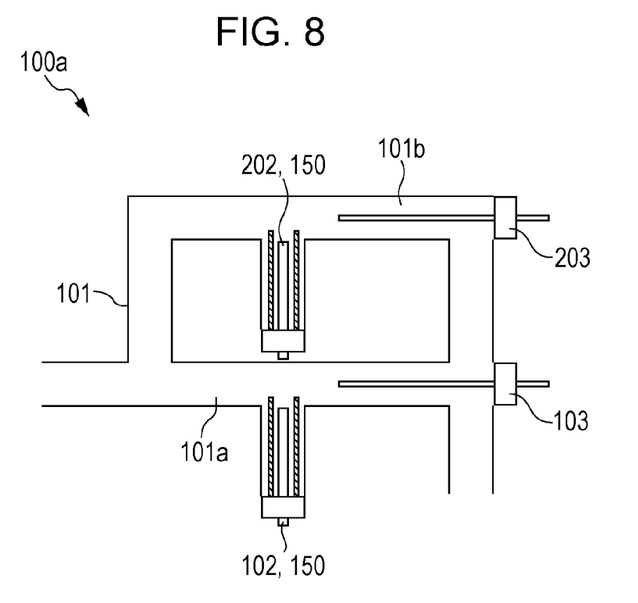
FIG. 8 schematically illustrates an example of the overall structure of a liquid treatment apparatus according to Embodiment 3 of the present disclosure.

FIG. 8 schematically illustrates an example of the overall structure of the liquid treatment apparatus 100a according to Embodiment 3. In FIG. 8, illustration of the power supply 104 and the gas supply unit 105 is omitted. As shown in FIG. 8, the liquid treatment apparatus 100a according to Embodiment 3 is different from those according to Embodiments 1 and 2 in that it further includes the third electrode 202 and the fourth electrode 203 that are disposed inside the second channel 101b of the dielectric tube 101. The other components of the liquid treatment apparatus 100a according to Embodiment 3 are the same as in Embodiment 1. Thus, the third electrode 202 and the fourth electrode 203 are described below.

<Third Electrode>

The third electrode 202 is at least partially disposed within the second channel 101b of the dielectric tube 101. The third electrode 202 may be constituted by, for example, only a metal electrode. An electrode unit that includes the third electrode 202 may be, for example, the electrode unit 150a described in Embodiment 1 or the electrode unit 150b described in Embodiment 2. The structure of the electrode unit that includes the third electrode 202 according to Embodiment 3 may be the same as or different from that of the electrode unit 150a that includes the first electrode 102, which is disposed in the first channel 101a of the dielectric tube 101.

The third electrode 202 is connected to a gas supply unit (not shown) that supplies gas into the second channel 101b of the dielectric tube 101. The gas supply unit connected to the third electrode 202 may be the gas supply unit 105 connected to the first electrode 102. In other words, the common gas supply unit 105 may supply gas into both the first electrode 102 and the third electrode 202. The liquid treatment apparatus 100a according to Embodiment 3 may include a plurality of gas supply units. For example, the liquid treatment apparatus 100a according to Embodiment 3 may include another gas supply unit connected to the third electrode 202 in addition to the gas supply unit 105 connected to the first electrode 102.

<Fourth Electrode>

The fourth electrode 203 is at least partially disposed within the second channel 101b of the dielectric tube 101. The fourth electrode 203 may be, for example, a columnar electrode having a diameter of 1 mm and may be composed of tungsten. However, the shape, size, and material of the fourth electrode 203 are not limited to those described above. The fourth electrode 203 may be composed of any metal material having conductivity. The fourth electrode 203 may be composed of, for example, iron, tungsten, copper, aluminum, platinum, or an alloy including one or more metals selected from these metals similarly to the third electrode 202. The structure of the fourth electrode 203 may be the same as that of the second electrode 103.

A power supply (not shown) that applies a voltage between the third electrode 202 and the fourth electrode 203 is connected therebetween. The power supply connected between the third electrode 202 and the fourth electrode 203 may be the power supply 104 connected between the first electrode and the second electrode. In other words, the common power supply 104 may apply a voltage both between the first electrode and the second electrode and between the third electrode 202 and the fourth electrode 203. The liquid treatment apparatus 100a according to Embodiment 3 may include a plurality of power supplies. For example, the liquid treatment apparatus 100a according to Embodiment 3 may include another power supply connected between the third electrode 202 and the fourth electrode 203 in addition to the power supply 104 connected between the first electrode and the second electrode.

The distance between the third electrode 202 and the fourth electrode 203 may be, for example, 10 mm. However, the distance between the third electrode 202 and the fourth electrode 203 is not limited to this and may be set appropriately so as to allow plasma to be generated. In the liquid treatment apparatus 100a including the dielectric tube 101, since the cross-sectional area of the channel through which the water to be treated flows is small, the resistance of the electrical pathway between the third electrode 202 and the fourth electrode 203 is likely to be heightened. Therefore, the distance between the two electrodes may be set appropriately depending on the inner diameter of the dielectric tube 101 that defines the channel. For example, when the inside diameter of the second channel 101b of the dielectric tube 101 is 5 mm, the distance between the third electrode 202 and the fourth electrode 203 may be set to 5 to 15 mm.

The fourth electrode 203 may be disposed, for example, upstream from the third electrode 202 in the second channel 101b of the dielectric tube 101. This allows plasma to be efficiently generated in the liquid treatment apparatus 100a according to Embodiment 3.

Effect

The liquid treatment apparatus 100a according to Embodiment 3 includes the third electrode 202 and the fourth electrode 203 disposed in the second channel 101b of the dielectric tube 101. This allows plasma to be generated also in the second channel 101b. In the liquid treatment apparatus 100a according to Embodiment 3, plasma can be efficiently generated both in the first channel 101a and the second channel 101b of the dielectric tube 101, thereby allowing liquid to be treated in a further short period of time. The liquid treatment apparatus 100a according to Embodiment 3 may be effectively used for treating liquid having a large volume.

In Embodiment 3, when the first channel 101a and the second channel 101b are arranged in parallel, the third electrode 202 and the fourth electrode 203 are disposed neither upstream nor downstream from the first electrode 102 and the second electrode 103. If the third electrode 202 and the fourth electrode 203 are arranged downstream of the first electrode 102 and the second electrode 103, gas bubble 111 ejected from the first electrode 102 flows toward the third electrode 202 located downstream of the first electrode 102. Thus, if such an arrangement is employed, the gas bubble 111 which has formed upstream may inhibit generation of plasma in the vicinity of the third electrode 202.

In the example shown in FIG. 8, the dielectric tube 101 defines the first channel 101a and the second channel 101b, and two pairs of electrodes are disposed in each channel. Optionally, for example, the dielectric tube 101 may further include a third channel. Furthermore, a fifth electrode and a sixth electrode may be disposed in the third channel. As described above, in the liquid treatment apparatus 100a, the dielectric tube 101 may include a plurality of channels and pairs of electrodes may be disposed in each channel. A liquid treatment apparatus 100a including a plurality of channels and a plurality of pairs of electrodes allows liquid having a further large volume to be treated in a short period of time. The liquid treatment apparatus 100a may include a plurality of power supplies and/or a plurality of gas supply units as many as pairs of the electrodes.

In the liquid treatment apparatus according to the present disclosure, the first electrode and the second electrode are disposed in the dielectric tube through which water to be treated flows, gas is supplied into the first electrode, and a voltage is applied between the first electrode and the second electrode. This allows, in the liquid treatment apparatus according to the present disclosure, gas bubble to be formed in the water to be treated that flows through the dielectric tube, thereby allowing plasma to be efficiently generated.

Thus, in the liquid treatment apparatus according to the present disclosure, germs contained in the water to be treated may be efficiently killed and/or chemical substances contained in the water to be treated may be efficiently decomposed using OH radicals produced by plasma. Therefore, the liquid treatment apparatus according to the present disclosure allows liquid treatment to be performed in a short period of time.

The dielectric tube of the liquid treatment apparatus according to the present disclosure includes the first channel in which the first electrode and the second electrode are disposed and a second channel that is different from the first channel. Thus, in the liquid treatment apparatus according to the present disclosure, the pressure inside the first channel can be reduced, consequently reducing the pressure applied through the first channel to the gas supply unit. Therefore, in the liquid treatment apparatus according to the present disclosure, reduction in the flow rate of the gas supplied from the gas supply unit into the first channel can be suppressed, the reduction caused due to the pressure applied through the first channel to the gas supply unit. As a result, the liquid treatment apparatus according to the present disclosure allows an efficient liquid treatment to be achieved. The liquid treatment apparatus according to the present disclosure may be effectively used when, for example, the flow rate of the water to be treated is high. Furthermore, in the liquid treatment apparatus according to the present disclosure, the pressure applied through the first channel to the gas supply unit can be reduced. Therefore, for example, a small pump having a low output may be used as a gas supply unit. As described above, the liquid treatment apparatus according to the present disclosure has improved liquid treatment efficiency while realizing reduction in the size thereof.

The structure of the electrode unit of the liquid treatment apparatus according to the present disclosure is not limited to those described above, and various structures may be employed. The electrode unit including the first electrode may have any structure as long as plasma can be generated in liquid in order to produce radicals.

The first electrode described above is arranged so that its longitudinal direction perpendicularly intersects the flow direction in which liquid flows though the dielectric tube. However, the first electrode of the liquid treatment apparatus according to the present disclosure may be arranged at any angle in the dielectric tube.

The dielectric tube of the liquid treatment apparatus according to the present disclosure defines the first channel and the second channel. The dielectric tube of the liquid treatment apparatus according to the present disclosure may also include three or more channels. In each of the plurality of channels, a pair of electrodes, a gas supply unit, and a power supply may be disposed. The pairs of the electrodes are disposed in each of the plurality of channels which are arranged in parallel. Thus, the liquid treatment apparatus according to the present disclosure allows an efficient liquid treatment to be achieved even when the volume of liquid to be treated is large.

The liquid treatment apparatus and the liquid treatment method according to the present disclosure may be effectively used in the following applications: an air conditioner, a humidifier, an electric shaver washer, a dish washer, a water treatment apparatus for water culture, an apparatus for circulating nourishing solution, a washing toilet seat, a water purifier, a washing machine, a pot, and an air cleaner.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A liquid treatment apparatus comprising:
  a dielectric tube, having an inlet and an outlet for water to be treated, for defining a channel through which the water to be treated flows from the inlet to the outlet, the channel being split into at least a first channel and a second channel at an inlet side of the dielectric tube, the first channel and the second channel being merged with each other at an outlet side of the dielectric tube;
    a first electrode at least partially disposed within the first channel;
    a second electrode at least partially disposed within the first channel, the second electrode being disposed on an inlet side of the first channel relative to the first electrode;
  a first gas-supply unit that supplies gas to form a gas bubble into the water to be treated to cause the gas bubble to cover at least part of the first electrode and flow through the first channel to the outlet; and
  a first power-supply that applies a voltage between the first electrode and the second electrode, wherein
  no gas bubble is in direct contact with the second electrode.

2. The liquid treatment apparatus according to claim 1, wherein the first power-supply applies the voltage between the first electrode and the second electrode, causing an electric discharge inside the gas bubble to generate plasma.

3. The liquid treatment apparatus according to claim 1 further comprising:
  an insulator surrounding the periphery of the first electrode with a space therebetween, the insulator having an opening through which the space communicates with the first channel of the dielectric tube,
  wherein the first gas-supply unit supplies the gas into the space, to form the gas bubble through the opening into the water to be treated that flows through the first channel.

4. The liquid treatment apparatus according to claim 3, wherein the first electrode includes:
  a metal electrode disposed within the first channel of the dielectric tube; and
  a metal fixing portion with which the first electrode is fixed in place, the metal fixing portion being connected to the power supply, and
  wherein the metal electrode and the metal fixing portion are composed of different materials.

5. The liquid treatment apparatus according to claim 4, wherein the metal fixing portion has a through hole through which the gas is supplied from the first gas-supply unit into the space.

6. The liquid treatment apparatus according to claim 1 further comprising an insulator disposed on the outer peripheral surface of the first electrode,
  wherein the first electrode is a hollow tubular electrode having an opening, and a hollow space of the first electrode communicates with an internal space of the dielectric tube through the opening, and
  wherein the first gas-supply unit supplies the gas into the space, to form the gas bubble through the opening into the water to be treated that flows through the first channel.

7. The liquid treatment apparatus according to claim 1, wherein at least part of the first electrode includes a region where a conductor surface thereof is exposed, and
  wherein the gas supply unit forms the gas bubble in the water to be treated, to cause the region of the first electrode to be located within the gas bubble.

8. The liquid treatment apparatus according to claim 1 further comprising:
  a third electrode at least partially disposed within the second channel of the dielectric tube; and
  a fourth electrode at least partially disposed within the second channel of the dielectric tube, the fourth electrode being disposed on an inlet side of the second channel relative to the third electrode,
  wherein the first gas-supply unit supplies gas to form a gas bubble into the water to be treated that flows through the second channel, and
  wherein the first power-supply applies a voltage between the third electrode and the fourth electrode.

9. The liquid treatment apparatus according to claim 1 further comprising:
  a third electrode at least partially disposed within the second channel of the dielectric tube;
  a fourth electrode at least partially disposed within the second channel of the dielectric tube, the fourth electrode being disposed upstream from the third electrode;
  a second gas-supply unit that supplies gas to form a gas bubble in the water to be treated that flows through the second channel; and
  a second power-supply that applies a voltage between the third electrode and the fourth electrode.

10. The liquid treatment apparatus according to claim 1, wherein the dielectric tube includes a second tube connected to the first channel, and
  the second tube houses at least part of the first electrode and extends along the first electrode in the longitudinal direction of the first electrode.

11. The liquid treatment apparatus according to claim 10, wherein a flow path of the water in the first channel perpendicularly crosses a hypothetical line extending from the first electrode, the hypothetical line extending in the longitudinal direction of the first electrode.

12. The liquid treatment apparatus according to claim 1, wherein the second electrode being entirely disposed on an inlet side of the first channel relative to the first electrode.

13. The liquid treatment apparatus according to claim 1, wherein the water to be treated in the first channel substantially entirely flows toward the outlet along an extending direction of the first channel.

14. A liquid treatment method for a liquid treatment apparatus comprising: a dielectric tube, having an inlet and an outlet for water to be treated, for defining a channel through which the water to be treated flows from the inlet to the outlet, the channel being split into at least a first channel and a second channel at an inlet side of the dielectric tube, the first channel and the second channel being merged with each other at an outlet side of the dielectric tube; a first electrode at least partially disposed within the first channel; and a second electrode at least partially disclosed within the first channel, the liquid treatment method comprising the steps of:
  feeding the water to be treated into the dielectric tube from the inlet so that the water to be treated flows to the outlet through the first and second channels;
  supplying gas to form a gas bubble into the water to be treated to cause the gas bubble to cover at least part of the first electrode and flow through the first channel to the outlet; and
  applying a voltage between the first electrode and the second electrode, wherein
  the second electrode is disposed on the inlet side of the first channel relative to the first electrode, and
  no gas bubble is in direct contact with the second electrode.

15. The liquid treatment method according to claim 14, wherein, in the step of applying the voltage, an electric discharge is caused inside the gas bubble to generate plasma.

16. The liquid treatment method according to claim 14, wherein the dielectric tube includes a second tube connected to the first channel, and
  the second tube houses at least part of the first electrode and extends along the first electrode in the longitudinal direction of the first electrode.

17. The liquid treatment method according to claim 16, wherein the flow path of a water in the first channel perpendicularly crosses a hypothetical line extending from the first electrode, the hypothetical line extending in a longitudinal direction of the first electrode.

18. The liquid treatment method according to claim 14, wherein the second electrode being entirely disposed on an inlet side of the first channel relative to the first electrode.

19. The liquid treatment method according to claim 14, wherein the water to be treated in the first channel substantially entirely flows toward the outlet along an extending direction of the first channel.

* * * * *